(12) United States Patent
Gao et al.

(10) Patent No.: US 11,055,201 B2
(45) Date of Patent: Jul. 6, 2021

(54) METHOD AND APPARATUS FOR EVALUATING CODE IN HIERARCHICAL ARCHITECTURE SOFTWARE, AND STORAGE MEDIUM

(71) Applicant: Siemens Aktiengesellschaft, Munich (DE)

(72) Inventors: Liang Gao, Beijing (CN); Jie Han, Beijing (CN); Fei Peng, Beijing (CN); Wen Ke Ren, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/546,468

(22) Filed: Aug. 21, 2019

(65) Prior Publication Data

US 2020/0065227 A1 Feb. 27, 2020

(30) Foreign Application Priority Data

Aug. 23, 2018 (CN) .......................... 201810968938.0

(51) Int. Cl.
*G06F 11/36* (2006.01)
*G06F 8/41* (2018.01)

(52) U.S. Cl.
CPC ............ *G06F 11/3616* (2013.01); *G06F 8/42* (2013.01); *G06F 11/36* (2013.01); *G06F 11/3604* (2013.01)

(58) Field of Classification Search
None
See application file for complete search history.

(56) References Cited

U.S. PATENT DOCUMENTS 8,473,907 B1 * 6/2013 Zandi .................. G06F 11/3616
717/120
2008/0320457 A1 12/2008 King et al.
(Continued)

FOREIGN PATENT DOCUMENTS

WO WO 2015199656 A1 12/2015

OTHER PUBLICATIONS

Extended European Search report dated Jan. 24, 2020.

*Primary Examiner* — Lewis A Bullock, Jr.
*Assistant Examiner* — Mark A Gooray
(74) *Attorney, Agent, or Firm* — Harness, Dickey & Pierce, P.L.C.

(57) ABSTRACT

Embodiments include a method and apparatus for evaluating code in hierarchical architecture software, and a storage medium. The method includes acquiring layer definition information, of hierarchical architecture software to be tested, including layer information and intra-layer component information; scanning code of the hierarchical architecture software to be tested, to acquire basic information of the code including component information, intra-component file information and intra-file code metric information; mapping the basic information with the layer definition information, to obtain file information of each component in each layer of the hierarchical architecture software to be tested and intra-file code metric information; and calculating a code evaluation parameter of the hierarchical architecture software to be tested, based upon the file information of each component in each layer and the intra-file code metric information. The technical solution in embodiments can acquire metric information, relating to layers, of hierarchical architecture software.

16 Claims, 8 Drawing Sheets

(56) References Cited

U.S. PATENT DOCUMENTS

| | | | |
|---|---|---|---|
| 2014/0181792 A1* | 6/2014 | Fanning | G06F 8/60 717/124 |
| 2017/0031800 A1 | 2/2017 | Shani et al. | |
| 2019/0163446 A1* | 5/2019 | Brunel | G06F 11/3604 |

\* cited by examiner

METHOD AND APPARATUS FOR EVALUATING CODE IN HIERARCHICAL ARCHITECTURE SOFTWARE, AND STORAGE MEDIUM

PRIORITY STATEMENT

The present application hereby claims priority under 35 U.S.C. § 119 to Chinese patent application number CN 201810968938.0 filed Aug. 23, 2018, the entire contents of which are hereby incorporated herein by reference.

FIELD

Embodiments of the present application relates to the field of software evaluation, in particular to a method and apparatus for evaluating code in hierarchical architecture software, and a storage medium.

BACKGROUND

Software plays a very important role in various aspects of people's lives. Hierarchical architecture software is one type of software implementation that is relatively common. Examples are software comprising a user interface layer, an application layer and a data management layer, and software comprising a presentation layer, an interface layer, a business layer and a retention layer; and so on. Multiple components are further included in each layer. Different softwares might have different hierarchical architectures; the specific type of hierarchical architecture used and the specific components included in each layer may be determined according to actual needs. However, regardless of the type of hierarchical architecture software, when code development is being performed or after the completion of code development, it might be necessary to evaluate the code, in order to obtain some associated description information relating to the code, such as code quality information, etc.

SUMMARY

In view of the above, in one embodiment of the present application, a method for evaluating code in hierarchical architecture software is proposed, and in other embodiments, an apparatus for evaluating code in hierarchical architecture software and a storage medium are proposed, for the purpose of obtaining associated metric information relating to a layer in hierarchical architecture software.

A method is for evaluating code in hierarchical architecture software as proposed in embodiments of the present invention comprises: acquiring layer definition information of hierarchical architecture software to be tested; the layer definition information comprising hierarchy information of the hierarchical architecture software to be tested and information of a component included in each layer; scanning code of the hierarchical architecture software to be tested, to acquire basic information of the code; the basic information comprising component information, intra-component file information and intra-file code metric information; the code metric information comprising the number of lines of code and/or the number of functions; mapping the basic information with the layer definition information, to obtain file information of each component in each layer of the hierarchical architecture software to be tested and intra-file code metric information; and calculating a code evaluation parameter of the hierarchical architecture software to be tested, on the basis of the file information of each component in each layer and the intra-file code metric information; the code evaluation parameter comprising: a layer thickness characterizing a layer software scale and/or a component thickness characterizing a software scale of each component in each layer. Clearly, in this embodiment, code evaluation of hierarchical architecture software to be tested is realized by determining intra-component file information and code metric information in each file on the basis of components included in layers, and in turn calculating layer thickness and/or intra-layer component thickness.

An apparatus for evaluating code in hierarchical architecture software as proposed in embodiments of the present application comprises: a definition information acquisition module, for acquiring layer definition information of hierarchical architecture software to be tested; the layer definition information comprising hierarchy information of the hierarchical architecture software to be tested and information of a component included in each layer; a basic information acquisition module, for scanning code of the hierarchical architecture software to be tested, to acquire basic information of the code; the basic information comprising component information, intra-component file information and intra-file code metric information; the code metric information comprising the number of lines of code and/or the number of functions; an information mapping module, for mapping the basic information with the layer definition information, to obtain file information of each component in each layer of the hierarchical architecture software to be tested and intra-file code metric information; and an information analysis calculating module, for calculating a code evaluation parameter of the hierarchical architecture software to be tested, on the basis of the file information of each component in each layer and the intra-file code metric information; the code evaluation parameter comprising: a layer thickness characterizing a layer software scale and/or a component thickness characterizing a software scale of each component in each layer. Clearly, in this embodiment, code evaluation of hierarchical architecture software to be tested is realized by determining intra-component file information and code metric information in each file on the basis of components included in layers, and in turn calculating the layer thickness characterizing the layer software scale and/or the component thickness characterizing the software scale of each component in each layer.

An apparatus for evaluating code in hierarchical architecture software as proposed in embodiments of the present invention comprises: at least one memory and at least one processor, wherein: the at least one memory stores a computer program; the at least one processor calls the computer program stored in the at least one memory, and executes the method for evaluating code in hierarchical architecture software in any one of the embodiments above.

A storage medium proposed in embodiments of the present invention has a computer program stored thereon, and is characterized in that the computer program is executable by a processor and realizes the method for evaluating code in hierarchical architecture software in any one of the embodiments above.

A method in an embodiment, for evaluating code in hierarchical architecture software, comprises:

acquiring layer definition information of hierarchical architecture software to be tested, the layer definition information including hierarchy information of the hierarchical architecture software to be tested and information of a component included in each layer;

scanning code of the hierarchical architecture software to be tested, to acquire basic information of the code, the basic information including component information, intra-component file information and intra-file code metric information and the code metric information including at least one of a number of lines of the code and a number of functions of the code;

mapping the basic information with the layer definition information, to obtain file information of each component in each layer of the hierarchical architecture software to be tested and intra-file code metric information; and calculating a code evaluation parameter of the hierarchical architecture software to be tested, based upon the file information of each component in each layer and the intra-file code metric information, the code evaluation parameter including at least one of a layer thickness characterizing a layer software scale and a component thickness characterizing a software scale of each component in each layer.

An apparatus in an embodiment, for evaluating code in hierarchical architecture software, comprises:

at least one memory storing a computer program; and at least one processor, to call the computer program stored in the at least one memory, and to execute at least the following:

acquiring layer definition information of hierarchical architecture software to be tested, the layer definition information including hierarchy information of the hierarchical architecture software to be tested and information of a component included in each layer;

scanning code of the hierarchical architecture software to be tested, to acquire basic information of the code, the basic information including component information, intra-component file information and intra-file code metric information and the code metric information including at least one of a number of lines of the code and a number of functions of the code;

mapping the basic information with the layer definition information, to obtain file information of each component in each layer of the hierarchical architecture software to be tested and intra-file code metric information; and calculating a code evaluation parameter of the hierarchical architecture software to be tested, based upon the file information of each component in each layer and the intra-file code metric information, the code evaluation parameter including at least one of a layer thickness characterizing a layer software scale and a component thickness characterizing a software scale of each component in each layer.

A non-transitory computer-readable storage medium in an embodiment, stores a computer program, the computer program being executable by a processor to realize the method for evaluating code in hierarchical architecture software of an embodiment.

BRIEF DESCRIPTION OF THE DRAWINGS

Example embodiments of the present invention are described in detail below with reference to the accompanying drawings, to give those skilled in the art a clearer understanding of the abovementioned and other features and advantages of the present invention.

In the drawings.

KEY TO THE DRAWINGS

Figure 1:
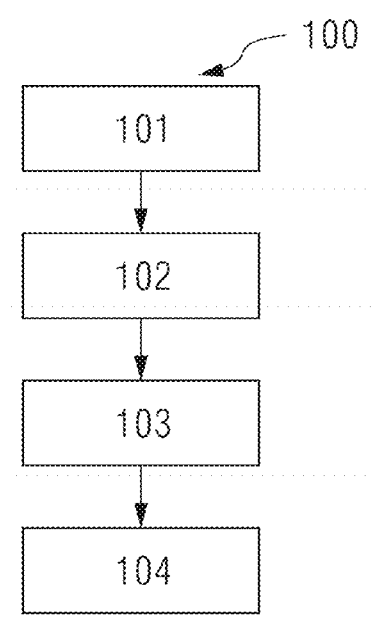
FIG. 1 is a demonstrative flow chart of a method for evaluating code in hierarchical architecture software in an embodiment of the present invention.

| Label | Meaning |
| --- | --- |
| 100, 800 | method for evaluating code in hierarchical architecture software |
| 101-104 | steps |
| 21, 31 | presentation layer |
| 22, 32 | API layer |
| 23, 33 | business layer |
| 24, 34 | persistence layer |
| 211-213, 221, 231-239, 241-242, 311-314, 321-325, 331-337, 341-342 | components |
| 500, 600, 700 | apparatus for evaluating code in hierarchical architecture software |
| 510 | definition information acquisition module |
| 520 | basic information acquisition module |
| 530 | information mapping module |
| 540 | information analysis calculating module |
| 550 | presentation module |
| 601 | memory |
| 602 | processor |
| 710 | graphical human-machine interface |
| 720 | background |
| 721 | application |
| 722 | analyzer |
| 723 | collector |
| 724 | file scanner |
| 725 | VCS scanner |
| 801-827 | steps |

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

A method is for evaluating code in hierarchical architecture software as proposed in embodiments of the present invention comprises: acquiring layer definition information of hierarchical architecture software to be tested; the layer definition information comprising hierarchy information of the hierarchical architecture software to be tested and information of a component included in each layer; scanning code of the hierarchical architecture software to be tested, to acquire basic information of the code; the basic information comprising component information, intra-component file information and intra-file code metric information; the code metric information comprising the number of lines of code and/or the number of functions; mapping the basic information with the layer definition information, to obtain file information of each component in each layer of the hierarchical architecture software to be tested and intra-file code metric information; and calculating a code evaluation parameter of the hierarchical architecture software to be tested, on the basis of the file information of each component in each layer and the intra-file code metric information; the code evaluation parameter comprising: a layer thickness characterizing a layer software scale and/or a component thickness characterizing a software scale of each component in each layer. Clearly, in this embodiment, code evaluation of hierarchical architecture software to be tested is realized by determining intra-component file information and code metric information in each file on the basis of components included in layers, and in turn calculating layer thickness and/or intra-layer component thickness.

In one embodiment, the code evaluation parameter further comprises: a layer complexity and/or component complexity; and the method further comprises: determining the layer complexity of the hierarchical architecture software to be tested on the basis of the layer thickness and a set layer thickness threshold; and/or determining the complexity of each component in each layer of the hierarchical architecture software to be tested on the basis of the thickness of each component in each layer and a set component thickness threshold. Clearly, in this embodiment, by further determining the layer complexity and/or the complexity of each component in each layer on the basis of the layer thickness and/or the thickness of each component in each layer, reference is provided for layer reconstruction and/or component reconstruction.

In one embodiment, the code evaluation parameter further comprises: a degree of coupling of a component; the code metric information further comprises: a cyclomatic complexity and a dependence number; and the method further comprises: comparing the thickness of each component with a set component thickness threshold, and when a component exceeding the component thickness threshold exists, taking the component exceeding the component thickness threshold as a component to be reconstructed, and acquiring from the basic information the cyclomatic complexity and dependence number of each file in the component to be reconstructed; and using the cyclomatic complexity and dependence number of each file in the component to be reconstructed to characterize the degree of coupling of the component to be reconstructed. Clearly, in this embodiment, by further determining the degree of coupling of a complex component on the basis of the layer thickness and/or the thickness of each component in each layer, further reference is provided for layer reconstruction and/or component reconstruction.

In one embodiment, the step of scanning code of the hierarchical architecture software to be tested, to acquire basic information of the code, comprises: on the basis of a storage type of the hierarchical architecture software to be tested, instructing a scanner of a corresponding type to scan code of the hierarchical architecture software to be tested, to acquire basic information of code obtained by scanning by the scanner. In this embodiment, a particular implementation apparatus for acquiring basic information is given, and implementation thereof is convenient.

In one embodiment, the step of instructing a scanner of a corresponding type to scan code of the hierarchical architecture software to be tested, on the basis of a storage type of the hierarchical architecture software to be tested, comprises: when the storage type of the hierarchical architecture software to be tested is a file type, instructing a file scanner to scan code of the hierarchical architecture software to be tested; when the storage type of the hierarchical architecture software to be tested is a version control system (VCS) type, instructing a VCS scanner to scan code of the hierarchical architecture software to be tested. In this embodiment, a particular implementation of a scanner is given.

In one embodiment, the method further comprises: presenting, on the basis of the layer thickness and/or the thickness of each component in each layer, all of the layers of the hierarchical architecture software to be tested and/or all of the components in each layer via a graph that is directly proportional to the layer thickness and/or the thickness of each component in each layer. Clearly, in this embodiment, the visual presentation of all of the layers and/or all of the components in each layer of corresponding thicknesses can make it easier for a user to locate, in a visually direct manner, layers and/or components which need to be reconstructed.

In one embodiment, the method further comprises: comparing all of the layer thicknesses and/or the thickness of each component with a set thickness threshold, and determining whether a layer and/or component exceeding the thickness threshold exists; when a layer and/or component exceeding the thickness threshold exists, presenting with high brightness a graph corresponding to the layer and/or component exceeding the thickness threshold. Clearly, in this embodiment, displaying a layer and/or component exceeding the thickness threshold with high brightness can make it easier for a user to quickly locate a layer and/or component which needs to be reconstructed.

In one embodiment, the method further comprises: determining thickness intervals in which all of the layer thicknesses and/or the thicknesses of all of the components in each layer are located, on the basis of different thickness intervals determined by at least two thickness thresholds of different values; presenting the layers of the hierarchical architecture software to be tested and/or all of the components in each layer on the basis of a color corresponding to each thickness interval that is set, via a graph of corresponding colors that are directly proportional to the layer thicknesses and/or the thickness of each component in each layer. The method can similarly make it easier for a user to quickly locate a layer and/or component which needs to be reconstructed.

In one embodiment, the method further comprises: comparing the cyclomatic complexity of each file in the component to be reconstructed with a cyclomatic complexity threshold, comparing the dependence number of each file in the component to be reconstructed with a dependence number threshold, and when a file with a cyclomatic complexity greater than the cyclomatic complexity threshold or a dependence number greater than the dependence number threshold exists, presenting the file. Clearly, this embodiment can make it easier for a user to locate, in a visually direct manner, a file in a component which needs to be reconstructed.

In one embodiment, the step of calculating a code evaluation parameter of the hierarchical architecture software to be tested, on the basis of the file information of each component in each layer and the intra-file code metric information, comprises: calculating the layer thickness of the hierarchical architecture software to be tested and/or the thickness of each component in each layer on the basis of the file information of each component in each layer and the intra-file code metric information according to any one of the formulae below:

$$TL1 = \frac{\sum_{1}^{f} nlf_i}{t \times \sum_{1}^{f} nff_i};$$

$$TL2 = \frac{\sum_{1}^{f} \frac{nlf_i}{t \times nff_i}}{f};$$

$$TL3 = \text{Median}\left(\frac{nlf_i}{t \times nff_i}\right);$$

$$TL4 = \frac{\frac{\sum \frac{nlf_i}{t \times nff_i}}{f} + \text{Median}\left(\frac{nlf_i}{t \times nff_i}\right)}{2};$$

wherein $nlf_i$ is the number of lines of code in one file, $nff_i$ is the number of functions in one file, $i=1, 2, \ldots, f$; t is a set constant, Median( ) is a median function; when f is the number of files in one layer, TL1, TL2, TL3 and TL 4 are layer thicknesses; when f is the number of files in one component, TL1, TL2, TL3 and TL4 are component thicknesses. In this embodiment, several formulae for calculating the layer thickness and/or component thickness are given, so implementation is convenient and flexible.

An apparatus for evaluating code in hierarchical architecture software as proposed in embodiments of the present application comprises: a definition information acquisition module, for acquiring layer definition information of hierarchical architecture software to be tested; the layer definition information comprising hierarchy information of the hierarchical architecture software to be tested and information of a component included in each layer; a basic information acquisition module, for scanning code of the hierarchical architecture software to be tested, to acquire basic information of the code; the basic information comprising component information, intra-component file information and intra-file code metric information; the code metric information comprising the number of lines of code and/or the number of functions; an information mapping module, for mapping the basic information with the layer definition information, to obtain file information of each component in each layer of the hierarchical architecture software to be tested and intra-file code metric information; and an information analysis calculating module, for calculating a code evaluation parameter of the hierarchical architecture software to be tested, on the basis of the file information of each component in each layer and the intra-file code metric information; the code evaluation parameter comprising: a layer thickness characterizing a layer software scale and/or a component thickness characterizing a software scale of each component in each layer. Clearly, in this embodiment, code evaluation of hierarchical architecture software to be tested is realized by determining intra-component file information and code metric information in each file on the basis of components included in layers, and in turn calculating the layer thickness characterizing the layer software scale and/or the component thickness characterizing the software scale of each component in each layer.

In one embodiment, the code evaluation parameter further comprises: a layer complexity and/or component complexity; and the information analysis calculating module is further used for: determining the layer complexity of the hierarchical architecture software to be tested on the basis of the layer thickness and a set layer thickness threshold; and/or determining the complexity of each component in each layer of the hierarchical architecture software to be tested on the basis of the thickness of each component in each layer and a set component thickness threshold. Clearly, in this embodiment, by further determining the layer complexity and/or the complexity of each component in each layer on the basis of the layer thickness and/or the thickness of each component in each layer, reference is provided for layer reconstruction and/or component reconstruction.

In one embodiment, the code evaluation parameter further comprises: a degree of coupling of a component; the code metric information further comprises: a cyclomatic complexity and a dependence number of a file; and the information analysis calculating module is further used for comparing the thickness of each component with a set component thickness threshold, and when a component exceeding the component thickness threshold exists, taking the component exceeding the component thickness threshold as a component to be reconstructed, and acquiring from the basic information the cyclomatic complexity and dependence number of each file in the component to be reconstructed; and using the cyclomatic complexity and dependence number of each file in the component to be reconstructed to characterize the degree of coupling of the component to be reconstructed. Clearly, in this embodiment, by further determining the degree of coupling of a complex component on the basis of the layer thickness and/or the thickness of each component in each layer, further reference is provided for layer reconstruction and/or component reconstruction.

In one embodiment, the apparatus further comprises: a presentation module, for presenting, on the basis of the layer thickness and/or the thickness of each component in each layer, all of the layers of the hierarchical architecture software to be tested and/or all of the components in each layer via a graph that is directly proportional to the layer thickness and/or the thickness of each component in each layer. Clearly, in this embodiment, the visual presentation of all of the layers and/or all of the components in each layer of corresponding thicknesses can make it easier for a user to locate, in a visually direct manner, layers and/or components which need to be reconstructed.

In one embodiment, the information analysis calculating module is further used for comparing all of the layer thicknesses and/or the thickness of each component with a set thickness threshold, and determining whether a layer and/or component exceeding the thickness threshold exists; when a layer and/or component exceeding the thickness threshold exists, the presentation module presents with high brightness a graph corresponding to the layer and/or component exceeding the thickness threshold. Clearly, in this embodiment, displaying a layer and/or component exceeding the thickness threshold with high brightness can make it easier for a user to quickly locate a layer and/or component which needs to be reconstructed.

In one embodiment, the information analysis calculating module is further used for determining thickness intervals in which the thicknesses of all of the layers and all of the components in each layer are located, on the basis of different thickness intervals determined by at least two thickness thresholds of different values; the presentation module presents the layers of the hierarchical architecture software to be tested and all of the components in each layer on the basis of a color corresponding to each thickness interval that is set, via a graph of corresponding colors that are directly proportional to the layer thicknesses and/or the thickness of each component in each layer. The method can similarly make it easier for a user to quickly locate a layer and/or component which needs to be reconstructed.

In one embodiment, the information analysis calculating module is further used for comparing the cyclomatic complexity of each file in the component to be reconstructed with a cyclomatic complexity threshold, comparing the dependence number of each file in the component to be reconstructed with a dependence number threshold, and determining whether a file with a cyclomatic complexity greater than the cyclomatic complexity threshold or a dependence number greater than the dependence number threshold exists; the presentation module is further used for: when a file with a cyclomatic complexity greater than the cyclomatic complexity threshold or a dependence number greater than the dependence number threshold exists, presenting the file. Clearly, this embodiment can make it easier for a user to locate, in a visually direct manner, a file in a component which needs to be reconstructed.

In one embodiment, the information analysis calculating module calculates the layer thickness of the hierarchical architecture software to be tested and/or the thickness of each component in each layer on the basis of the code metric information of each component in each layer according to any one of the formulae below:

$$TL1 = \frac{\sum_{1}^{f} nlf_i}{t \times \sum_{1}^{f} nff_i};$$

$$TL2 = \frac{\sum_{1}^{f} \frac{nlf_i}{t \times nff_i}}{f};$$

$$TL3 = \text{Median}\left(\frac{nlf_i}{t \times nff_i}\right);$$

$$TL4 = \frac{\frac{\sum \frac{nlf_i}{t \times nff_i}}{f} + \text{Median}\left(\frac{nlf_i}{t \times nff_i}\right)}{2};$$

wherein $nlf_i$ is the number of lines of code in one file, $nff_i$ is the number of functions in one file, $i=1, 2, \ldots, f$; $t$ is a set constant, Median( ) is a median function; when f is the number of files in one layer, TL1, TL2, TL3 and TL4 are layer thicknesses; when f is the number of files in one component, TL1, TL2, TL3 and TL4 are component thicknesses. In this embodiment, several formulae for calculating the layer thickness and/or component thickness are given, so implementation is convenient and flexible.

In one embodiment, the basic information acquisition module comprises: a collector, for: on the basis of a storage type of the hierarchical architecture software to be tested, instructing a scanner of a corresponding type to scan code of the hierarchical architecture software to be tested, to acquire basic information of code obtained by scanning by the scanner; and a scanner, for scanning code of the hierarchical architecture software to be tested, according to the instruction of the collector, to obtain basic information of the code. In this embodiment, a particular implementation apparatus for acquiring basic information is given, and implementation thereof is convenient.

In one embodiment, the scanner comprises: a file scanner, for scanning code of hierarchical architecture software to be tested that is stored in file type, to obtain basic information of the code; and/or a version control system (VCS) scanner, for scanning code of hierarchical architecture software to be tested that is stored in VCS type, to obtain basic information of the code. In this embodiment, a particular implementation of a scanner is given.

An apparatus for evaluating code in hierarchical architecture software as proposed in embodiments of the present invention comprises: at least one memory and at least one processor, wherein: the at least one memory stores a computer program; the at least one processor calls the computer program stored in the at least one memory, and executes the method for evaluating code in hierarchical architecture software in any one of the embodiments above.

A storage medium proposed in embodiments of the present invention has a computer program stored thereon, and is characterized in that the computer program is executable by a processor and realizes the method for evaluating code in hierarchical architecture software in any one of the embodiments above.

At present, although various analytic tools exist for the evaluation of software quality, these are all directed at the software in its entirety; at the present time, there are still no analytic tools for each layer in hierarchical architecture software, and so there is no way of learning some associated description information relating to a layer, such as code evaluation parameter information relating to a layer, including layer thickness, complexity and degree of coupling, for the purpose of indicating whether too many service functions or too few tasks are present in the layer, etc.

For this reason, in embodiments of the present invention, consideration is given to the determination, on the basis of components included in a layer, of intra-component file information, as well as code metric information in each file, e.g. the number of code lines and/or the number of functions. In turn, the number of files in each layer is determined, and on the basis of the number of files in each layer and code metric information of each file, a layer thickness characterizing layer software scale is calculated. Alternatively, it is possible to calculate a component thickness characterizing component software scale, on the basis of the number of files in each component and code metric information of each file. Furthermore, layer complexity can be determined on the basis of the layer thickness, and component complexity can be determined on the basis of the component thickness. In addition, for a component whose component thickness attains a certain value, it is possible to characterize the degree of coupling of the component on the basis of the cyclomatic complexity and dependence number of each file in the component.

Furthermore, in order to display in a visually direct manner the layer thickness and/or component thickness of hierarchical architecture software, it/they can be visually displayed; for components in different thickness value intervals, different colors may be used for display, or a component whose thickness attains a certain value may be displayed with high brightness, for reference by a user when performing reconstruction.

In order to clarify the object, technical solution and advantages of the present invention, the present invention is explained in further detail below by way of embodiments.

FIG. 1 is a demonstrative flow chart of a method 100 for evaluating code in hierarchical architecture software in an embodiment of the present invention. As FIG. 1 shows, the method 100 may comprise the following steps:

Step 101, acquiring layer definition information of hierarchical architecture software to be tested. The layer definition information comprises hierarchy information of the hierarchical architecture software to be tested and information of (a) component(s) included in each layer.

In this step, the layer definition information may be acquired in advance from outside, e.g. acquired from a network or a storage medium, etc.; alternatively, layer definition information inputted by a user via a human-machine interface (UI) could also be received. In other embodiments, the layer definition information could also comprise information such as storage type and position of the hierarchical architecture software.

Layer definition information in one example is shown below:

```
{
    "layers": [{                                 ; layers
        "id": "1",                               ; first layer
        "name": "API",
        "level": "1",
        "components": [{                         ; components
            "name": "rest",                      ; first component
            "type": "API",
            "path": "com.company.application.running.rest"
        },
        {
            "name": "schedule",   ; second component
            "type": "component",
            "path":
"com.company.application.running.schedule"
        },
        {
            "name": "msg",              ; third component
            "type": "component",
            "path": "com.company.application.running.msg"
        },
        {
            "name": "response",   ; fourth component
            "type": "component",
            "path":
"com.company.application.running.response"
        }
        ]
    },
    {
        "id": "2",                               ; second layer
        "name": "Service",
        "level": "2",
        "components": [{                         ; components
            "name": "services",
            "type": "component",
            "path":
"com.company.application.running.services"
        }]
    },
    {
        "id": "3",                               ; third layer
        "name": "Repository",
        "level": "3",
        ......
```

Step 102, scanning code of the hierarchical architecture software to be tested, to acquire basic information of the code. The basic information comprises component information, intra-component file information, and intra-file code metric information; the code metric information comprises the number of lines of code and/or the number of functions.

In this step, consideration is given to the possibility that different hierarchical architecture softwares will have different storage types, such as a file storage type or version control system (VCS) storage type. Correspondingly, when scanning the code of the hierarchical architecture software, it is possible, on the basis of a storage type of the hierarchical architecture software to be tested, to use a scanner of a corresponding type to scan the code, and acquire basic information of the code. For example, a file scanner is used to scan code of hierarchical architecture software to be tested that is stored in file type, and a VCS scanner is used to scan code of hierarchical architecture software to be tested that is stored in VCS type.

A storage type and storage position of hierarchical architecture software to be tested may be acquired from the layer definition information in step 101, but could also be acquired through another channel. For example, it is possible to receive, via a human-machine interface (UI), an instruction of a user to acquire code basic information of hierarchical architecture software to be tested; code storage type and position information may be provided simultaneously in the instruction, and a collector is triggered to collect basic information obtained by a file scanner or VCS scanner scanning the code of the hierarchical architecture software to be tested.

In this step, the process of scanning code of the hierarchical architecture software to be tested to acquire basic information of the code may be realized by a single scan, but could also be realized by two or more scans. For example, it is possible to first of all scan description information of the code, comprising component information and intra-component file information, and then scan metric information such as the number of lines of code and the number of functions in the file(s).

Step 103, mapping the basic information with the layer definition information, to acquire file information of each component in each layer of the hierarchical architecture software to be tested and intra-file code metric information.

The code scanning in step 102 can only acquire information of all of the components and the file(s) included therein, but cannot learn which components belong to which layer on the basis of the code; therefore, it is necessary to perform mapping with the layer definition information in step 101, in order to acquire file information of each component in each layer and intra-file code metric information. On the basis of the file information of each component in each layer, it is possible to further acquire information about (a) file(s) in each layer, such as the total number of files in each layer.

Step 104, calculating a code evaluation parameter of the hierarchical architecture software to be tested, on the basis of the file information of each component in each layer and the intra-file code metric information. In this embodiment, the code evaluation parameter may comprise a layer thickness characterizing a layer software scale and/or a component thickness characterizing a software scale of each component in each layer.

In this step, it is possible to calculate the thickness of each layer in the hierarchical architecture software, and/or the thickness of each component in each layer, according to user requirements.

For example, it is possible to calculate the layer thickness on the basis of the total number of files in each layer and the code metric information of each file; and on the basis of the total number of files in each component and the code metric information of each file, calculate the thickness of the component.

Taking the calculation of layer thickness as an example, the layer thickness TL may be calculated according to any one of formulae (1)-(4) below on the basis of the total number f of files in each layer and the code metric information of each file, such as the number nlfi of lines of code and the number nffi of functions.

$$TL1 = \frac{\sum_{1}^{f} nlf_i}{t \times \sum_{1}^{f} nff_i} \quad (1)$$

$$TL2 = \frac{\sum_{1}^{f} \frac{nlf_i}{t \times nff_i}}{f} \quad (2)$$

$$TL3 = \text{Median}\left(\frac{nlf_i}{t \times nff_i}\right) \quad (3)$$

$$TL4 = \frac{\frac{\sum \frac{nlf_i}{t \times nff_i}}{f} + \text{Median}\left(\frac{nlf_i}{t \times nff_i}\right)}{2} \quad (4)$$

wherein TL1, TL2, TL3 and TL4 are layer thicknesses, f is the number of files in one layer, i=1, 2, . . . , f; $nlf_i$ is the number of lines of code in one file, $nff_i$ is the number of functions in one file, t is a set constant, which may be determined according to an empirical value, and Median( ) is a median function.

In addition, the component thickness may also be calculated with reference to any one of the four formulae above, the difference being that f is the number of files in one component.

For example, layer thickness calculation results in two examples are shown separately below.

Table 1 shows a case where 12 files are included in one layer in one example, and values of the number of lines of code and the number of functions in each file.

TABLE 1

| File index | No. of functions | No. of lines of code |
|---|---|---|
| 1 | 10 | 101 |
| 2 | 11 | 117 |
| 3 | 20 | 272 |
| 4 | 7 | 53 |
| 5 | 4 | 37 |
| 6 | 15 | 202 |
| 7 | 17 | 164 |
| 8 | 12 | 118 |
| 9 | 9 | 82 |
| 10 | 8 | 97 |
| 11 | 1 | 4 |
| 12 | 4 | 34 |

Table 2 shows values of the layer thickness calculated using the 4 formulae above on the basis of the data in table 1.

TABLE 2

| TL formula | Formula (1) | Formula (2) | Formula (3) | Formula (4) |
|---|---|---|---|---|
| TL value | 1.085593 | 1.071281 | 0.97402 | 1.022651 |

Table 3 shows a case where 63 files are included in one layer in one example, and values of the number of lines of code and the number of functions in each file.

TABLE 3

| File index | No. of functions | No. of lines of code |
|---|---|---|
| 1 | 39 | 5033 |
| 2 | 28 | 2275 |
| 3 | 36 | 4788 |
| 4 | 21 | 1879 |
| 5 | 27 | 2003 |
| 6 | 34 | 4566 |
| 7 | 39 | 5524 |
| 8 | 22 | 1706 |
| 9 | 28 | 2345 |
| 10 | 16 | 1218 |
| 11 | 38 | 5098 |
| 12 | 25 | 1879 |
| 13 | 19 | 1410 |
| 14 | 16 | 1232 |
| 15 | 20 | 1813 |
| 16 | 32 | 4356 |
| 17 | 16 | 1402 |
| 18 | 25 | 1921 |
| 19 | 22 | 1578 |
| 20 | 28 | 2305 |
| 21 | 38 | 6012 |
| 22 | 31 | 4256 |
| 23 | 25 | 1907 |
| 24 | 18 | 2112 |
| 25 | 30 | 4221 |
| 26 | 38 | 4506 |
| 27 | 15 | 1103 |
| 28 | 35 | 4630 |
| 29 | 15 | 1232 |
| 30 | 30 | 2407 |
| 31 | 19 | 1245 |
| 32 | 26 | 2202 |
| 33 | 15 | 1234 |
| 34 | 40 | 5510 |
| 35 | 36 | 5121 |
| 36 | 15 | 1145 |
| 37 | 15 | 1289 |
| 38 | 35 | 4767 |
| 39 | 34 | 4123 |
| 40 | 27 | 2109 |
| 41 | 33 | 4213 |
| 42 | 40 | 5231 |
| 43 | 30 | 2378 |
| 44 | 25 | 1809 |
| 45 | 15 | 1342 |
| 46 | 39 | 4804 |
| 47 | 23 | 1657 |
| 48 | 30 | 2356 |
| 49 | 31 | 4325 |
| 50 | 38 | 2403 |
| 51 | 16 | 1120 |
| 52 | 33 | 5034 |
| 53 | 17 | 1476 |
| 54 | 36 | 4379 |
| 55 | 16 | 890 |
| 56 | 38 | 5765 |
| 57 | 16 | 1409 |
| 58 | 32 | 4121 |
| 59 | 18 | 2245 |
| 60 | 25 | 1765 |
| 61 | 40 | 4370 |
| 62 | 19 | 1455 |
| 63 | 36 | 4983 |

Table 4 shows values of the layer thickness calculated using the 4 formulae above on the basis of the data in table 3.

TABLE 4

| TL formula | Formula (1) | Formula (2) | Formula (3) | Formula (4) |
|---|---|---|---|---|
| TL value | 10.793 | 10.16483 | 8.7625 | 9.463664 |

In other embodiments, it is also possible to only use the number of lines of code in a layer to determine the layer thickness, and the number of lines of code in each component to determine the component thickness; alternatively, it is also possible to only use the number of functions in a layer to determine the layer thickness, and the number of functions in each component to determine the component thickness.

In one embodiment, the code evaluation parameter may further comprise: layer complexity and/or component complexity. During particular implementation, the layer complexity and/or component complexity may be determined on the basis of the layer thickness and/or the thickness of each component in each layer, according to the principle that a larger value indicates greater complexity. Alternatively, it is also possible to preset a layer thickness threshold and/or a component thickness threshold, and determine the layer complexity and/or component complexity according to the principle that the complexity is greater if the layer thickness and/or the thickness of each component in each layer exceed(s) the threshold(s) by a greater amount. For example, the layer complexity of the hierarchical architecture software to be tested is determined on the basis of the layer thickness and a set layer thickness threshold; the complexity of each component in each layer of the hierarchical architecture software to be tested is determined on the basis of the thickness of each component in each layer and a set component thickness threshold.

In another embodiment, the code evaluation parameter may further comprise: the degree of coupling of a component. At this time, the code metric information in step 102 may further comprise: the cyclomatic complexity and dependence number of a file. The dependence number is the number of times that a function or type in a file is cited by another function or type. The method may further comprise: comparing the thickness of each component with a set component thickness threshold, and determining whether a component exceeding the component thickness threshold exists; when a component exceeding the component thickness threshold exists, taking the component exceeding the component thickness threshold as a component to be reconstructed, and acquiring from the basic information the cyclomatic complexity and dependence number of each file in the component to be reconstructed exceeding the component thickness threshold; using the cyclomatic complexity and dependence number of each file in the component to be reconstructed exceeding the component thickness threshold to characterize the degree of coupling of the component to be reconstructed exceeding the component thickness threshold. Furthermore, it is also possible to compare the cyclomatic complexity of each file in the component to be reconstructed with a corresponding cyclomatic complexity threshold, compare the dependence number of each file in the component to be reconstructed with a dependence number threshold, and when a file with a cyclomatic complexity higher than the cyclomatic complexity threshold or a dependence number higher than the dependence number threshold exists, take the file as a file to be reconstructed, and display the file to be reconstructed.

In addition, in other embodiments, in order to display in a visually direct manner the layer thickness of hierarchical architecture software to be tested and/or the thickness of each component in each layer, it is possible to present all of the layers of the hierarchical architecture software to be tested and/or all of the components in each layer via a graph that is directly proportional to the layer thickness and/or the thickness of each component in each layer.

Figure 2:
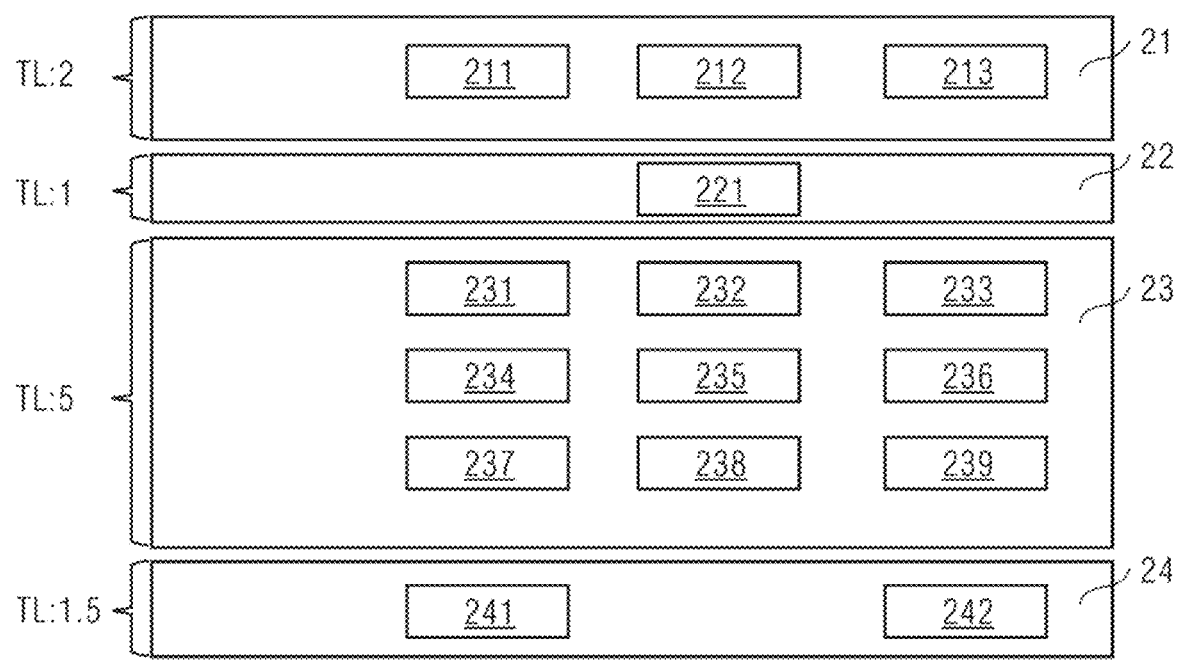
FIG. 2 is a graphical demonstrative chart of layers of hierarchical architecture software to be tested in one example embodiment of the present invention.

For example, FIG. 2 shows a graphical demonstrative chart of layers of hierarchical architecture software to be tested in one example embodiment of the present invention. As shown in FIG. 2, the hierarchical architecture software 2 to be tested in this example comprises four sub-layers: a presentation layer 21, an application programming interface (API) layer 22, a business layer 23 and a persistence layer 24. The presentation layer 21 comprises 3 components 211-213, and has a layer thickness of 2; the API layer 22 comprises 1 component 221, and has a layer thickness of 1; the business layer 23 comprises 9 components 231-239, and has a layer thickness of 5; the persistence layer 24 comprises 2 components 241-242, and has a layer thickness of 1.5. Only the layer thickness is reflected in FIG. 2; the component thickness is not reflected.

Figure 3:
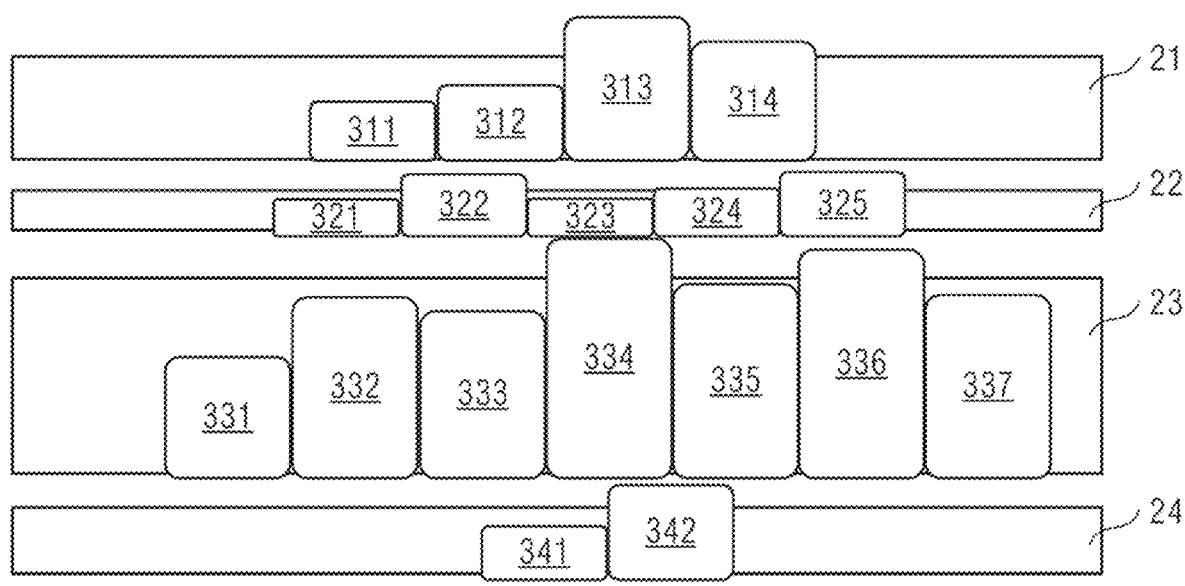
FIG. 3 is a graphical demonstrative chart of layers and intra-layer components of hierarchical architecture software to be tested in another example embodiment of the present invention.

As another example, FIG. 3 shows a graphical demonstrative chart of layers and intra-layer components of hierarchical architecture software to be tested in another example embodiment of the present invention. As shown in FIG. 3, the hierarchical architecture software 3 to be tested in this example similarly comprises four sub-layers: a presentation layer 31, an API layer 32, a business layer 33 and a persistence layer 34. The presentation layer 31 comprises 4 components 311-314 of different thicknesses, the API layer 32 comprises 5 components 321-325 of different thicknesses, the business layer 33 comprises 7 components 331-337 of different thicknesses, and the persistence layer 34 comprises 2 components 341-342 of different thicknesses.

In one embodiment, in order to provide a reference for a user to perform layer reconstruction and/or component reconstruction, it is possible to further compare all of the layer thicknesses and/or the thickness of each component with a set thickness threshold, and determine whether a layer and/or component exceeding the thickness threshold exists; when a layer and/or component exceeding the thickness threshold exists, a graph corresponding to the layer and/or component exceeding the thickness threshold is presented with high brightness.

In another embodiment, it is also possible for different thickness intervals to be determined by at least two thickness thresholds of different values, and for a different color to be set for each thickness interval; the thickness intervals in which all of the layer thicknesses and/or the thicknesses of all of the components in each layer are located are then determined; and on the basis of the color corresponding to each thickness interval that is set, the layers of the hierarchical architecture software to be tested and/or all of the components in each layer are presented via a graph of corresponding colors that are directly proportional to the layer thicknesses and/or the thickness of each component in each layer.

Figure 4:
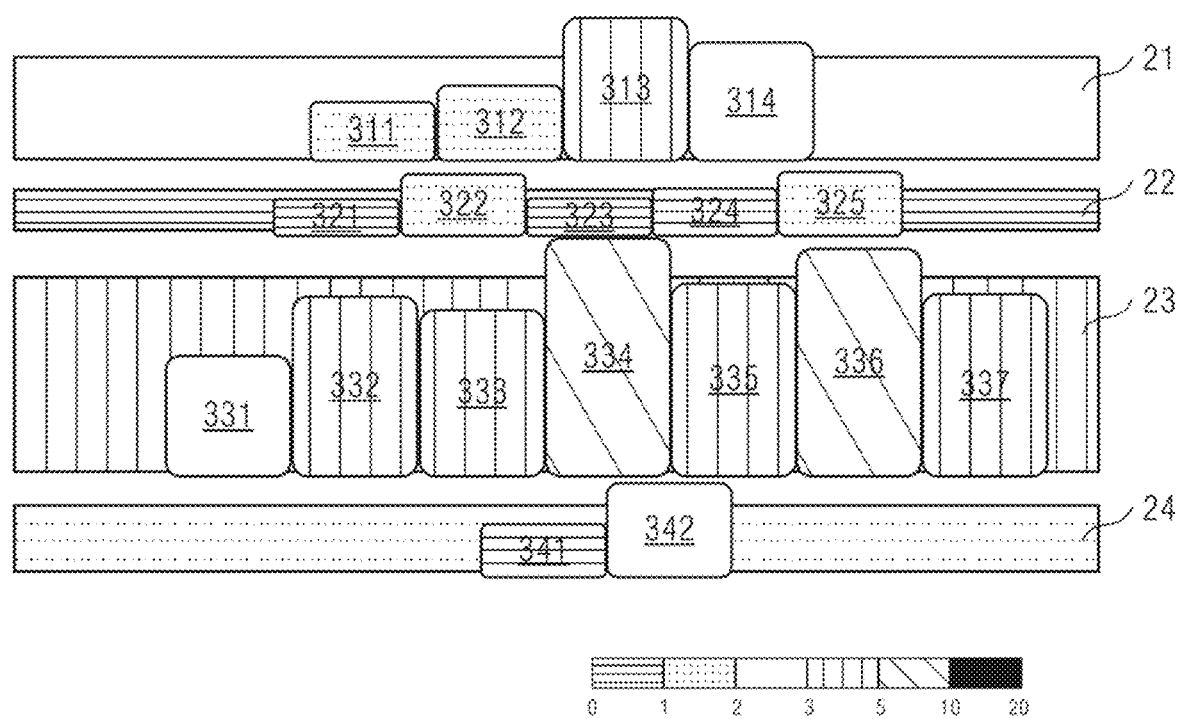
FIG. 4 is a graphical demonstrative chart of different colors, based on the layers and intra-layer components of hierarchical architecture software to be tested in the example embodiment shown in FIG. 3.

For example, FIG. 4 is a graphical demonstrative chart of different colors, based on the layers and intra-layer components of hierarchical architecture software to be tested in the example shown in FIG. 3. Suppose that there are 6 thickness intervals [0,1], [1,2], [2,3], [3,5], [5,10] and [10,20] formed by 5 threshold thicknesses 1, 2, 3, 5 and 10, and that different thickness intervals are provided with different colors, numbered 1 to 6 from left to right, as shown in FIG. 4; for clarity of representation, different fill-in modes are used to represent different colors in the figure. Of course, in actual applications, graphs with different fill-in modes could also be used for different thickness intervals; no restriction is imposed here with regard to this. In this embodiment, the colors of the layers and components presented on the basis of layer thickness and component thickness are as follows: the presentation layer 31 is color no. 3, and within the presentation layer 31, components 311 and 312 are color no. 2, component 313 is color no. 3, and component 314 is color no. 4; the API layer 32 is color no. 1, and within the API layer 32, components 321, 323 and 324 are color no. 1, and components 322 and 325 are color no. 2; the business layer 33 is color no. 4, and within the business layer 33, components 332, 333, 335 and 337 are color no. 4, component 331 is color no. 3, and components 334 and 336 are color no. 5; the persistence layer 34 is color no. 2, and within the persistence layer 34, component 341 is color no. 1, and component 342 is color no. 3.

The method for evaluating code in hierarchical architecture software in embodiments of the present invention has been described in detail above; an apparatus for evaluating code in hierarchical architecture software in embodiments of the present invention will now be described in detail below. The apparatus in embodiments of the present invention may be used to realize the abovementioned method in embodiments of the present invention. For details not disclosed in the apparatus description in embodiments of the present invention, reference may be made to the corresponding descriptions in the abovementioned method in embodiments of the present invention.

Figure 5:
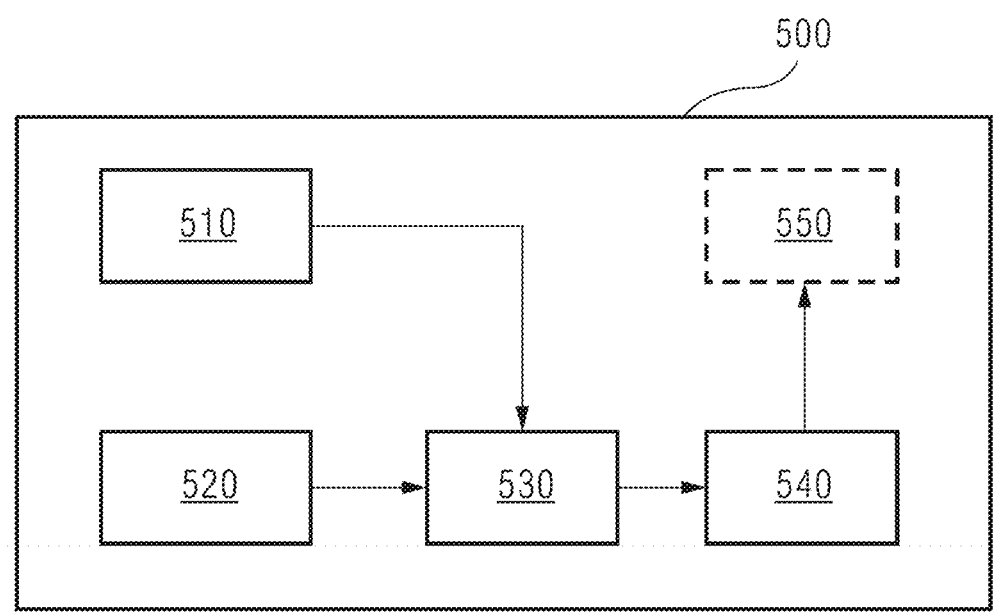
FIG. 5 is a demonstrative structural diagram of an apparatus for evaluating code in hierarchical architecture software in an embodiment of the present invention.

FIG. 5 is a demonstrative structural diagram of an apparatus 500 for evaluating code in hierarchical architecture software in an embodiment of the present invention. As shown in FIG. 5, the apparatus 500 may comprise: a definition information acquisition module 510, a basic information acquisition module 520, an information mapping module 530 and an information analysis calculating module 540.

The definition information acquisition module 510 is used for acquiring layer definition information of hierarchical architecture software to be tested; the layer definition information comprises hierarchy information of the hierarchical architecture software to be tested and information of (a) component(s) included in each layer.

The basic information acquisition module 520 is used for scanning code of the hierarchical architecture software to be tested, to acquire basic information of the code; the basic information comprises component information, intra-component file information, and intra-file code metric information; the code metric information comprises the number of lines of code and/or the number of functions.

During particular implementation, the basic information acquisition module 520 may comprise: a collector (not shown in FIG. 5) and a scanner (not shown in FIG. 5). The collector is used for: on the basis of a storage type of the hierarchical architecture software to be tested, instructing a scanner of a corresponding type to scan code of the hierarchical architecture software to be tested, to acquire basic information of the code. The scanner is used for scanning code of the hierarchical architecture software to be tested, according to the instruction of the collector, to obtain basic information of the code.

For example, in one embodiment, the scanner may comprise a file scanner (not shown in FIG. 5) and/or a VCS scanner (not shown in FIG. 5). The file scanner is used to scan code of hierarchical architecture software to be tested that is stored in file type, to obtain basic information of the code; the VCS scanner is used to scan code of hierarchical architecture software to be tested that is stored in VCS type, to obtain basic information of the code.

The information mapping module 530 is used for mapping the basic information with the layer definition information, to obtain file information of each component in each layer of the hierarchical architecture software to be tested and intra-file code metric information.

The information analysis calculating module 540 calculates a code evaluation parameter of the hierarchical architecture software to be tested, on the basis of the file information of each component in each layer and the intra-file code metric information. In this embodiment, the code evaluation parameter may comprise: a layer thickness characterizing a layer software scale and/or a component thickness characterizing a software scale of each component in each layer.

The layer thickness and/or component thickness may be calculated in accordance with any one of formulae (1)-(4) in step 104 shown in FIG. 1. When calculating the layer thickness, f in the formulae is the total number of files in the layer; when calculating the component thickness, f in the formulae is the total number of files in the component. In addition, the layer thickness may also be determined on the basis of the number of lines of code or the number of functions in the layer. The component thickness may also be determined only on the basis of the number of lines of code or the number of functions in the component.

In one embodiment, the code evaluation parameter may further comprise: layer complexity and/or component complexity. Correspondingly, the information analysis calculating module 540 may be further used for determining the layer complexity of the hierarchical architecture software to be tested on the basis of the layer thickness and a set layer thickness threshold; and/or determining the complexity of each component in each layer of the hierarchical architecture software to be tested on the basis of the thickness of each component in each layer and a set component thickness threshold.

In another embodiment, the code evaluation parameter may further comprise: the degree of coupling of a component; correspondingly, the code metric information may further comprise: the cyclomatic complexity and dependence number of a file. At this time, the information analysis calculating module 540 may be further used for comparing the thickness of each component with a set component thickness threshold, and when a component exceeding the component thickness threshold exists, taking the component exceeding the component thickness threshold as a component to be reconstructed, and acquiring from the basic information the cyclomatic complexity and dependence number of each file in the component to be reconstructed; and using the cyclomatic complexity and dependence number of each file in the component to be reconstructed to characterize the degree of coupling of the component to be reconstructed. Furthermore, it is also possible to compare the cyclomatic complexity of each file in the component to be reconstructed with a cyclomatic complexity threshold, compare the dependence number of each file in the component to be reconstructed with a dependence number threshold, and when a file with a cyclomatic complexity higher than the cyclomatic complexity threshold or a dependence number higher than the dependence number threshold exists, take the file as a file to be reconstructed.

In another embodiment, the apparatus may further comprise: a presentation module 550, for presenting, on the basis of the layer thickness and/or the thickness of each component in each layer, all of the layers of the hierarchical architecture software to be tested and/or all of the components in each layer via a graph that is directly proportional to the layer thickness and/or the thickness of each component in each layer.

Furthermore, in order to provide a reference for a user to perform layer reconstruction and/or component reconstruction, the information analysis calculating module 540 may be further used for comparing all of the layer thicknesses and/or the thickness of each component with a set thickness threshold, and determining whether a layer and/or component exceeding the thickness threshold exists; correspondingly, when a layer and/or component exceeding the thickness threshold exists, the presentation module 550 presents with high brightness a graph corresponding to the layer and/or component exceeding the thickness threshold.

Alternatively, the information analysis calculating module 540 is further used for determining thickness intervals in which the thicknesses of all of the layers and all of the components in each layer are located, on the basis of different thickness intervals determined by at least two thickness thresholds of different values; correspondingly, the presentation module 550 may present the layers of the hierarchical architecture software to be tested and all of the components in each layer on the basis of a color corresponding to each thickness interval that is set, via a graph of corresponding colors that are directly proportional to the layer thicknesses and/or the thickness of each component in each layer.

In one embodiment, the presentation module 550 may be further used for presenting the abovementioned file to be reconstructed.

Figure 6:
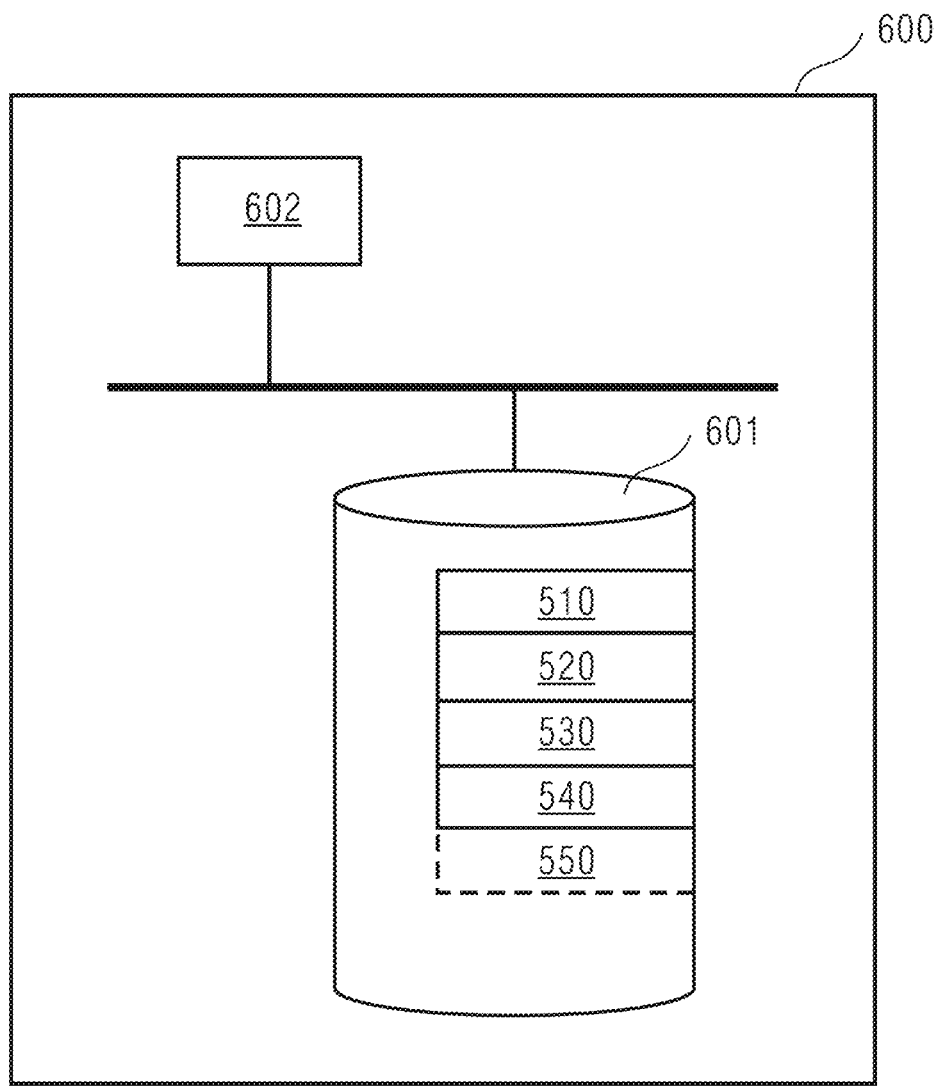
FIG. 6 is a demonstrative structural diagram of another apparatus for evaluating code in hierarchical architecture software in an embodiment of the present invention.

FIG. 6 is a demonstrative structural diagram of another apparatus 600 for evaluating code in hierarchical architecture software in an embodiment of the present invention. As shown in FIG. 6, the apparatus 600 for evaluating code in hierarchical architecture software may comprise: at least one memory 601 and at least one processor 602. Of course, the apparatus for evaluating code in hierarchical architecture software may further comprise some other components, such as a communication port, etc. These components may communicate via a bus 603.

The at least one memory 601 is used for storing a computer program. In one embodiment, the computer program may be understood to comprise all of the modules of the apparatus shown in FIG. 5 for evaluating code in hierarchical architecture software, i.e. the definition information acquisition module 510, the basic information acquisition module 520, the information mapping module 530 and the information analysis calculating module 540. In other embodiments, the presentation module 550 may be further included.

Furthermore, the at least one memory 601 may also store an operating system, etc. Operating systems include but are not limited to: an Android operating system, a Symbian operating system, a Windows operating system and a Linux operating system, etc.

The at least one processor 602 is used for calling the computer program stored in the at least one memory 601, in order to execute the method for evaluating code in hierarchical architecture software shown in FIG. 1 in an embodiment of the present invention, on the basis of a function of at least one port receiving data. The processor 602 may be a CPU, a processing unit/module, an ASIC, a logic module or a programmable gate array, etc.

It must be explained that not all of the steps and modules in the flows and structural diagrams above are necessary; certain steps or modules may be omitted according to actual requirements. The order in which steps are executed is not fixed, but may be adjusted as required. The partitioning of the modules is merely functional partitioning, employed for the purpose of facilitating description; during actual implementation, one module may be realized by multiple modules, and the functions of multiple modules may be realized by the same module; these modules may be located in the same device, or in different devices.

Figure 7:
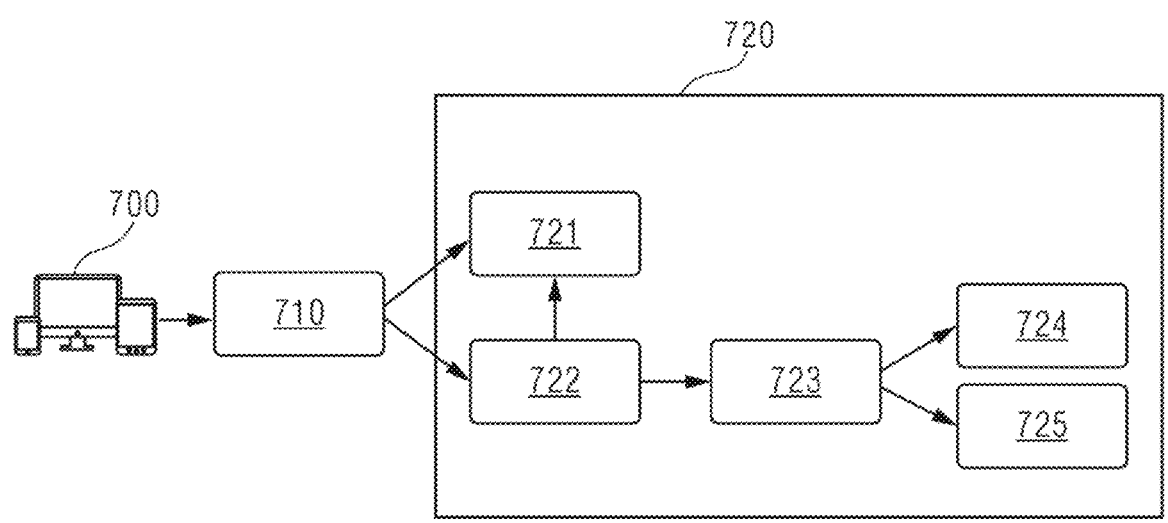
FIG. 7 is a structural schematic diagram of an apparatus for evaluating code in hierarchical architecture software in one example embodiment of the present invention.

For example, FIG. 7 shows a structural schematic diagram of an apparatus 700 for evaluating code in hierarchical architecture software in one example embodiment of the present invention. As shown in FIG. 7, the apparatus may comprise: a graphical human-machine interface (Graph UI) 710 and, located in a background 720, an application 721, an analyzer 722, a collector 723, a file scanner 724 and a VCS scanner 725.

Figure 8:
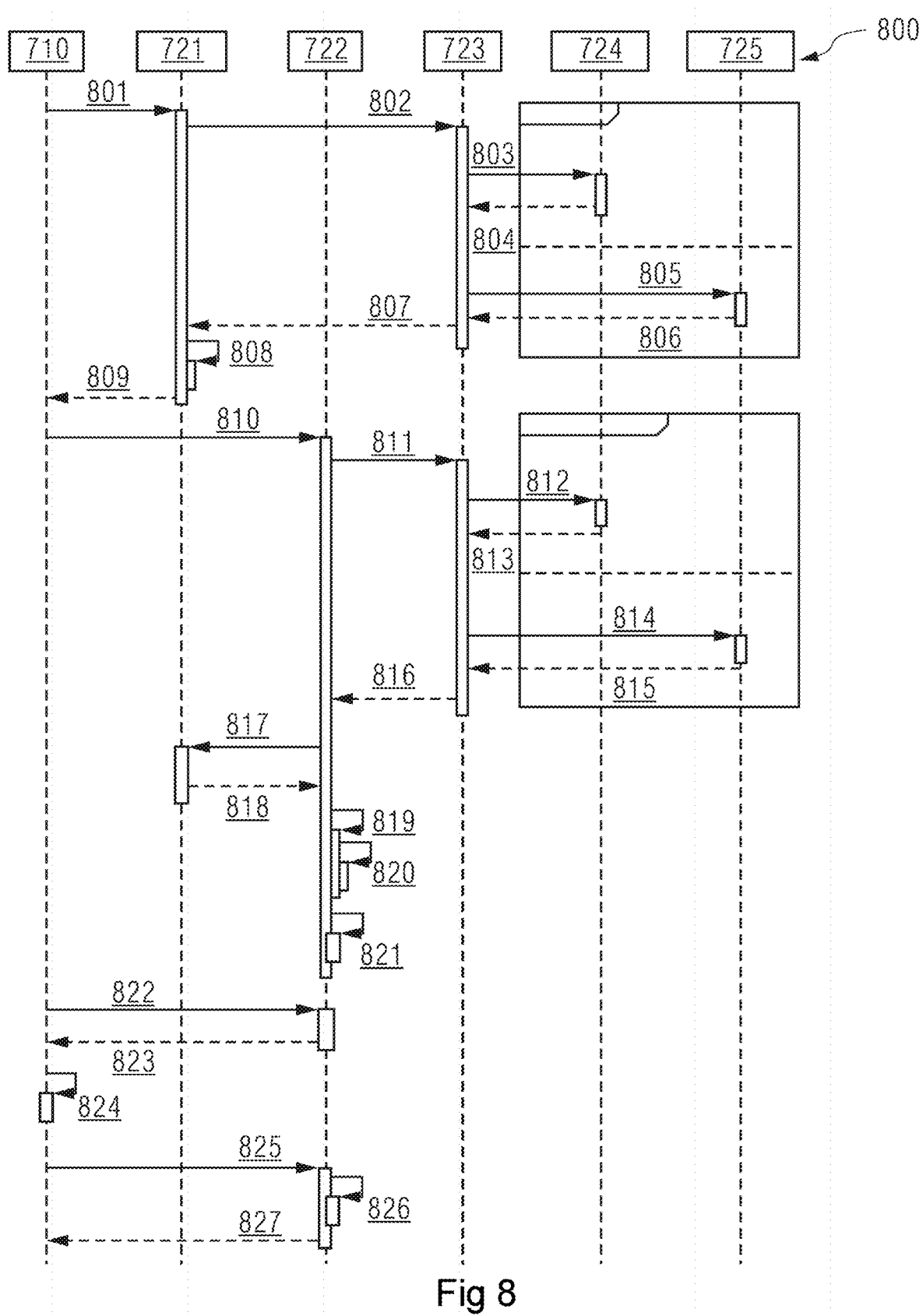
FIG. 8 is a schematic flow chart of a method for evaluating code in hierarchical architecture software, based on the apparatus shown in FIG. 7.

FIG. 8 is a schematic flow chart of a method for evaluating code in hierarchical architecture software, based on the apparatus 700 shown in FIG. 7. As FIG. 8 shows, the flow may comprise the following steps:

Step 801, the application 721 receiving layer definition information, comprising hierarchy information and information of (a) component(s) included in each layer, of hierarchical architecture software to be tested, as well as metadata storage type and position information, which are inputted by a user via the graphical human-machine interface 710.

Step 802, the application 721 instructing the collector 723 to collect metadata of the hierarchical architecture software to be tested, on the basis of the metadata storage type and position information.

Steps 803-806, the collector 723, on the basis of a storage type of the hierarchical architecture software to be tested, instructing a scanner of a corresponding type (the file scanner 724 or the VCS scanner 725) to scan metadata of the hierarchical architecture software to be tested, and receiving the metadata obtained by the scanner (the file scanner 724 or the VCS scanner 725).

Step 807, the collector 723 providing the received metadata to the application 721.

Steps 808-809, the application 721 making the metadata from the collector 723 persistent, and providing same to the graphical human-machine interface 710 for presentation.

Step 810, the analyzer 722 receiving a basic information collection trigger command, inputted by the user via the graphical human-machine interface 710.

Step 811, the analyzer 722 instructing the collector 723 to collect basic information of the hierarchical architecture software to be tested.

Steps 812-815, the collector 723, on the basis of the storage type of the hierarchical architecture software to be tested, instructing the scanner of the corresponding type (the file scanner 724 or the VCS scanner 725) to scan code of the hierarchical architecture software to be tested, and receiving basic information, comprising component information, intra-component file information and intra-file code metric information, of the code, obtained by the scanner (the file scanner 724 or the VCS scanner 725), wherein the code metric information may comprise: the number of lines of code, the number of functions, the cyclomatic complexity and the dependence number.

Step 816, the collector 723 providing the received basic information to the analyzer 722.

Steps 817-818, the application 721 mapping the basic information from the analyzer 722 with the layer definition information received in step 801, to obtain file information of each component in each layer of the hierarchical architecture software to be tested and intra-file code metric information, and providing the file information of each component in each layer and the intra-file code metric information to the analyzer 722.

Steps 819-820, the analyzer 722 calculating a layer thickness of each layer and a component thickness in each layer, on the basis of the file information of each component in each layer and the intra-file code metric information.

Step 821, the analyzer 722 making the layer thickness of each layer and the component thickness in each layer persistent.

Steps 822-823, the analyzer 722 receiving a thickness data acquisition instruction inputted by the user via the graphical human-machine interface 710, and on the basis of the instruction, providing the layer thickness of each layer and the component thickness in each layer to the graphical human-machine interface 710.

Step 824, the graphical human-machine interface 710, on the basis of the layer thickness of each layer and the component thickness in each layer, presenting all of the layers of the hierarchical architecture software to be tested and (a) component(s) in each layer via a graph that is directly proportional to the layer thickness of each layer and the component thickness in each layer. An example is the graph shown in FIG. 3 or FIG. 4.

Steps 825-827, the analyzer 722 receiving a reconstruction prompt instruction inputted by the user via the graphical human-machine interface 710, and on the basis of the reconstruction prompt instruction, determining complexity on the basis of layer thickness and component thickness, and calculating degree of coupling on the basis of cyclomatic complexity and dependence information (e.g. dependence number) in the basic information; and on the basis of the complexity and degree of coupling, presenting information about a component whose reconstruction is advised via the graphical human-machine interface 710.

Clearly, in the examples shown in FIGS. 7 and 8, the graphical human-machine interface 710 and the application 721 together realize the function of the definition information acquisition module 510; the collector 723 and the file scanner 724 or VCS scanner 725 together realize the function of the basic information acquisition module 520; the application 721 realizes the function of the information mapping module 530; and the analyzer 722 realizes the function of the information analysis calculating module 540.

It can be understood that hardware modules in the embodiments above may be realized mechanically or electronically. For example, one hardware module may comprise a specially designed permanent circuit or logic device (such as a dedicated processor, such as an FPGA or ASIC) for completing a specific operation. The hardware module may also comprise a programmable logic device or circuit that is temporarily configured by software (e.g. comprising a general processor or another programmable processor) for executing a specific operation. The choice of whether to specifically use a mechanical method, or a dedicated permanent circuit, or a temporarily configured circuit (e.g. configured by software) to realize the hardware module can be decided according to considerations of cost and time.

An embodiment of the present invention also provides a machine-readable storage medium, in which is stored an instruction for causing a machine to execute the method according to an embodiment of the present invention. Specifically, a system or apparatus equipped with a storage medium may be provided; software program code realizing the function of any one of the embodiments above is stored on the storage medium, and a computer (or CPU or MPU) of the system or apparatus is caused to read and execute the program code stored in the storage medium. Furthermore, it is also possible to cause an operating system etc. operating on a computer to complete a portion of, or all, actual operations via an instruction based on program code. It is also possible for program code read out from the storage medium to be written into a memory installed in an expansion board inserted in the computer, or written into a memory installed in an expansion unit connected to the computer, and thereafter instructions based on the program code cause a CPU etc. installed on the expansion board or expansion unit to execute a portion of and all actual operations, so as to realize the function of any one of the embodiments above. Embodiments of storage media used for providing program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROM. Optionally, program code may be downloaded from a server computer via a communication network.

The embodiments above are merely preferred embodiments of the present invention, which are not intended to limit it. Any amendments, equivalent substitutions or improvements etc. made within the spirit and principles of the present invention shall be included in the scope of protection thereof.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for evaluating code in hierarchical architecture software, comprising:
    acquiring layer definition information of hierarchical architecture software to be tested, the layer definition information including hierarchy information of the hierarchical architecture software to be tested and information of a component included in each layer;
    scanning code of the hierarchical architecture software to be tested, to acquire basic information of the code, (A) the basic information including component information, intra-component file information relating the component information to file information, and intra-file code metric information and (B) the intra-file code metric information including a cyclomatic complexity, a dependence number, and at least one of a number of lines of the code and a number of functions of the code;
    mapping the basic information with the layer definition information, to obtain file information of each component in each layer of the hierarchical architecture software to be tested and the intra-file code metric information;
    calculating a code evaluation parameter of the hierarchical architecture software to be tested, based upon the file information of each component in each layer and the intra-file code metric information, the code evaluation parameter including a degree of coupling of a component and at least one of a layer thickness characterizing a layer software scale and a component thickness characterizing a software scale of each component in each layer;
    comparing a thickness of each component with a set component thickness threshold;
    taking, upon a component exceeding the set component thickness threshold, the component exceeding the set component thickness threshold as a component to be reconstructed, and acquiring from the basic information the cyclomatic complexity and dependence number of each file in the component to be reconstructed; and
    using the cyclomatic complexity and dependence number of each file in the component to be reconstructed to characterize the degree of coupling of the component to be reconstructed;
    comparing the cyclomatic complexity of each file in the component to be reconstructed with a cyclomatic complexity threshold;
    comparing the dependence number of each file in the component to be reconstructed with a dependence number threshold; and
    adaptively presenting the one or more files of the component to be reconstructed as files to be reconstructed based on if the respective file has a cyclomatic complexity greater than the cyclomatic complexity threshold or a dependence number is greater than the dependence number threshold.

2. The method of claim 1, wherein the code evaluation parameter further includes at least one of a layer complexity and a component complexity, and the method further comprises at least one of:
    determining the layer complexity of the hierarchical architecture software to be tested based upon the layer thickness and a set layer thickness threshold; and
    determining a complexity of each component in each layer of the hierarchical architecture software to be tested based upon the thickness of each component in each layer and the set component thickness threshold.

3. The method of claim 2, wherein the scanning of the code of the hierarchical architecture software to be tested, to acquire basic information of the code, comprises:
  instructing, based upon a storage type of the hierarchical architecture software to be tested, a scanner of a corresponding type to scan code of the hierarchical architecture software to be tested, to acquire the basic information of the code obtained by scanning by the scanner.

4. The method of claim 2, further comprising:
  presenting, based upon at least one of the layer thickness and a thickness of each component in each layer, at least one of all of the layers of the hierarchical architecture software to be tested and all of the components in each layer via a graph that is directly proportional to the layer thickness and the thickness of each component in each layer.

5. The method of claim 1, wherein the scanning of the code of the hierarchical architecture software to be tested, to acquire basic information of the code, comprises:
  instructing, based upon a storage type of the hierarchical architecture software to be tested, a scanner of a corresponding type to scan code of the hierarchical architecture software to be tested, to acquire the basic information of code obtained by scanning by the scanner.

6. The method of claim 5, wherein the instructing of the scanner of the corresponding type to the scan code of the hierarchical architecture software to be tested, based upon a storage type of the hierarchical architecture software to be tested, comprises:
  instructing, upon the storage type of the hierarchical architecture software to be tested being a file type, a file scanner to the scan code of the hierarchical architecture software to be tested; and
  instructing, upon the storage type of the hierarchical architecture software to be tested being a version control system (VCS) type, a VCS scanner to the scan code of the hierarchical architecture software to be tested.

7. The method of claim 6, further comprising:
  presenting, based upon at least one of the layer thickness and the thickness of each component in each layer, at least one of all of the layers of the hierarchical architecture software to be tested and all of the components in each layer via a graph that is directly proportional to the layer thickness and the thickness of each component in each layer.

8. The method of claim 5, further comprising:
  presenting, based upon at least one of the layer thickness and the thickness of each component in each layer, at least one of all of the layers of the hierarchical architecture software to be tested and all of the components in each layer via a graph that is directly proportional to the layer thickness and the thickness of each component in each layer.

9. The method of claim 1, wherein the scanning of the code of the hierarchical architecture software to be tested, to acquire basic information of the code, comprises:
  instructing, based upon a storage type of the hierarchical architecture software to be tested, a scanner of a corresponding type to scan code of the hierarchical architecture software to be tested, to acquire basic information of the code obtained by scanning by the scanner.

10. The method of claim 1, further comprising:
  presenting, based upon at least one of the layer thickness and the thickness of each component in each layer, at least one of all of the layers of the hierarchical architecture software to be tested and all of the components in each layer via a graph that is directly proportional to at least one of the layer thickness and the thickness of each component in each layer.

11. The method of claim 10, further comprising:
  comparing at least one of all of the layer thicknesses and the thickness of each component with a set thickness threshold, and determining whether at least one of a layer and component exceeding the set thickness threshold exists; and
  presenting, upon at least one of a layer and component exceeding the thickness threshold, with high brightness a graph corresponding to at least one of the layer and component exceeding the set thickness threshold.

12. The method of claim 11, further comprising:
  determining thickness intervals in which at least one of all of the layer thicknesses and the thicknesses of all of the components in each layer are located, based upon different thickness intervals determined by at least two thickness thresholds of different values; and
  presenting at least one of the layers of the hierarchical architecture software to be tested and all of the components in each layer based upon a color corresponding to each thickness interval that is set, via a graph of corresponding colors that are directly proportional to at least one of the layer thicknesses and the thickness of each component in each layer.

13. The method of claim 10, further comprising:
  determining thickness intervals in which at least one of all of the layer thicknesses and the thicknesses of all of the components in each layer are located, based upon different thickness intervals determined by at least two thickness thresholds of different values; and
  presenting at least one of the layers of the hierarchical architecture software to be tested and all of the components in each layer based upon a color corresponding to each thickness interval that is set, via a graph of corresponding colors that are directly proportional to at least one of the layer thicknesses and the thickness of each component in each layer.

14. The method of claim 1, further comprising:
  presenting, based upon at least one of the layer thickness and a thickness of each component in each layer, at least one of all of the layers of the hierarchical architecture software to be tested and all of the components in each layer via a graph that is directly proportional to the layer thickness and the thickness of each component in each layer.

15. A non-transitory computer-readable storage medium, storing a computer program, the computer program being executable by a processor to realize the method for evaluating code in the hierarchical architecture software of claim 1.

16. An apparatus for evaluating code in hierarchical architecture software, comprising:
  at least one memory storing a computer program; and
  at least one processor, to call the computer program stored in the at least one memory, and to cause the apparatus to perform at least the following:
  acquiring layer definition information of hierarchical architecture software to be tested, the layer definition information including hierarchy information of the hierarchical architecture software to be tested and information of a component included in each layer;

scanning code of the hierarchical architecture software to be tested, to acquire basic information of the code, (A) the basic information including component information, intra-component file information relating component information to file information and intra-file code metric information and (B) the intra-file code metric information including a cyclomatic complexity, a dependence number, and at least one of a number of lines of the code and a number of functions of the code;

mapping the basic information with the layer definition information, to obtain file information of each component in each layer of the hierarchical architecture software to be tested and the intra-file code metric information;

calculating a code evaluation parameter of the hierarchical architecture software to be tested, based upon the file information of each component in each layer and the intra-file code metric information, the code evaluation parameter including a degree of coupling of a component and at least one of a layer thickness characterizing a layer software scale and a component thickness characterizing a software scale of each component in each layer;

comparing a thickness of each component with a set component thickness threshold;

taking, upon a component exceeding the set component thickness threshold, the component exceeding the set component thickness threshold as a component to be reconstructed, and acquiring from the basic information the cyclomatic complexity and dependence number of each file in the component to be reconstructed;

using the cyclomatic complexity and dependence number of each file in the component to be reconstructed to characterize the degree of coupling of the component to be reconstructed;

comparing the cyclomatic complexity of each file in the component to be reconstructed with a cyclomatic complexity threshold;

comparing the dependence number of each file in the component to be reconstructed with a dependence number threshold; and adaptively presenting the one or more files of the component to be reconstructed as files to be reconstructed based on if the respective file has a cyclomatic complexity greater than the cyclomatic complexity threshold or a dependence number is greater than the dependence number threshold.

\* \* \* \* \*